United States Patent Office 3,488,926
Patented Jan. 13, 1970

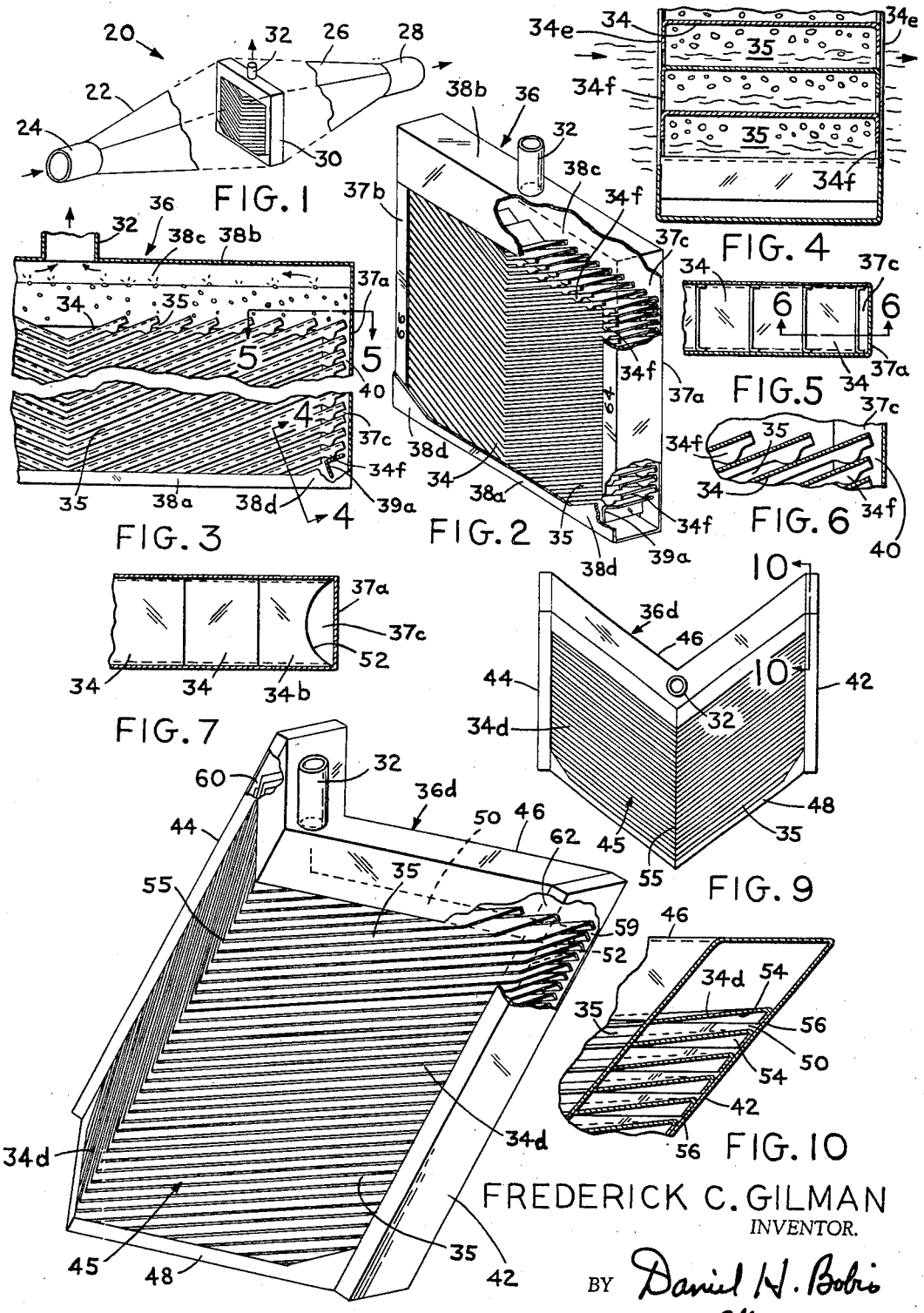

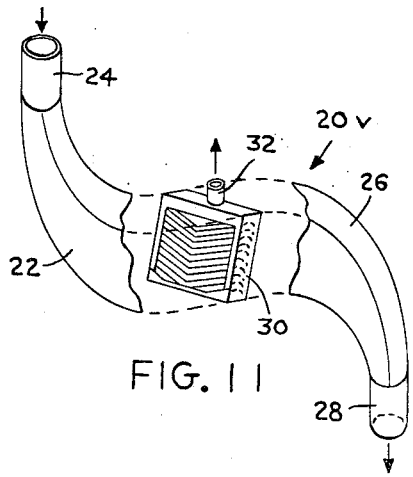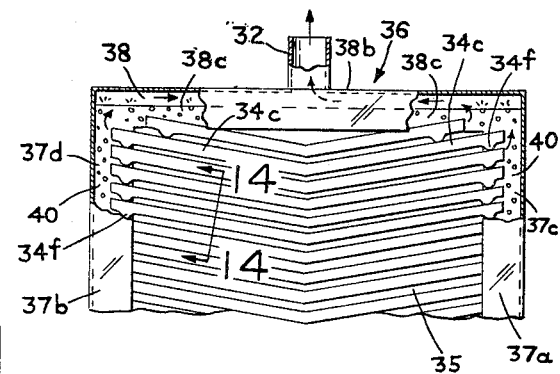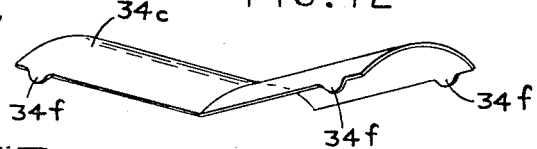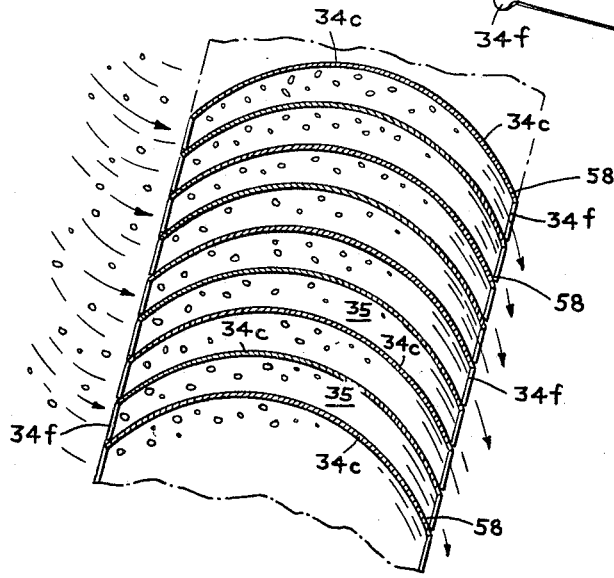

3,488,926
SEPARATOR FOR REMOVING GAS BUBBLES FROM FLOWING LIQUIDS
Frederick C. Gilman, Pompton Lakes, N.J., assignor to Harrworth, Inc., Harrison, N.J., a corporation of Delaware
Filed Mar. 8, 1968, Ser. No. 711,544
Int. Cl. B01d *19/00*
U.S. Cl. 55—199                    9 Claims

ABSTRACT OF THE DISCLOSURE

A gas-liquid separator in which a liquid stream containing entrained gas bubbles is directed through a plurality of vertically stacked, generally horizontal flow passages at relatively low velocity. The gas bubbles tend to rise to the top of each flow passage where they are collected and are carried off and separately discharged through passages in the structure of the gas liquid separator.

Brief summary of the invention

The efficient unloading of an oil tanker through the use of centrifugal pump means currently requires, in accordance with the state of this art, a flotation type gas bubble separator upstream of the centrifugal pump inlet to effect the separation of oil vapors entrained in bubble form in the oil cargo. Since the size and density of entrained gas bubbles varies widely, it is generally necessary to provide a flotation tank of large size to accomplish this gas-oil separation. Many existing oil carrying ships cannot accommodate large flotation tanks, due to severe ship space limitations, whereby the removal of the oil cargo through the use of centrifugal pump stripping means becomes either very lengthy and consequently very expensive in process, or in some instances not at all feasible. The present invention is believed to advance the state of this art be eliminating the need for a large flotation chamber upstream of the centrifugal pump inlet and providing instead, compact, highly efficient gas separator means suitable for use within the limited space available in many existing oil tankers to thus make the latter suitable for the application thereto of the centrifugal pump, cargo stripping operation.

The basic considerations in the design of compact gas separator means of this nature are as follows. When a two-phase fluid mixture of gas bubbles in a liquid is flowing through a horizontal pipe or conduit, separation of the constituents is dependent on maintenance of a low level of turbulence within the mixture. A well established non-dimensional criterion of the degree of turbulence is the Reynolds number, defined as the product of principal velocity, a characteristic distance normal to the principal velocity and the density, all divided by the viscosity of the fluid.

In most engineering examples of fluid transport such as in the suction piping of centrifugal pumps and especially as applied to the handling of oil cargo aboard tankers, economical selections of pipe sizes result in turbulent pipe flow. Some compact device is therefor needed to control and streamline the flow for a sufficient distance to permit the rising of gas bubbles. In order to avoid the cost and inconvenience of a large enclosure we reject the stratagem of reducing Reynolds number by reducing only the principal velocity of the fluid. In any case this is an inefficient method of reducing Reynolds number since the cross dimension factor must be increased by at least the one half power of the velocity reduction factor. Since density and viscosity are not under arbitrary control, we must contrive to reduce the characteristic cross dimension. This can be done by subdividing the total flow passage into a number of parallel passages. One might imagine such a section as a comb smoothing out the cross currents initially present. In this zone then the bubbles can rise to the top of each passage undisturbed and coalesce there with other bubbles.

To minimize the time and horizontal travel distance required for the buoyant release of gas bubbles, it becomes desirable to subdivide the liquid flow passage vertically into a plurality of nearly horizontal passages.

Another reason for subdividing the vertical dimension is that the buoyant force tends to move the bubbles vertically relative to the liquid stream. Therefore, we are concerned with means to minimize vertical components of cross current turbulence which are most inimical to prompt an orderly separation. Cross currents are suppressed most effectively in the direction of minimum dimension.

Means of separation or escape must be provided within the quiet or laminar zone or re-mixing will occur when the liquid streams come together again in a single full sized passage. Gas separation means are provided by forming each partition of the multi-channel zone as an inverted trough whose length is disposed at an angle to the liquid flow direction. These troughs are given a moderate tilt from the horizontal from the center toward both ends. At the elevated ends these inverted trough partitions are secured in vertical or somewhat inclined channels which provide shielding from horizontal liquid flow. Here the collected gas bubbles from the plurality of inverted troughs combine to form a rapidly rising concentration of coalesced bubbles with no interference from liquid crossflow. The streams of rising enlarged bubbles from each support channel enter a gas collection and venting compartment at the top of the separator enclosure. This compartment is in direct communication with both sides of the separation grid, and an external gas off take connection.

It is, accordingly, an object of this invention to provide compact, highly efficient gas separator means.

Another object of this invention is to provide gas separator means which are of particularly simple, and thus most economical design and construction.

Another object of this invention is the provision of gas separator means of particularly durable design and construction having no moving parts whereby long periods of satisfactory, maintenance-free operation thereof are assured.

A further object of this invention is the provision of gas separator means which are particularly, though by no means exclusively, adapted for use in the separation of oil vapors, in gas bubble form, from oils during the unloading of the latter from oil tankers.

The above and other objects and advantages of this invention are believed made clear by the following detailed description thereof taken in conjunction with the accompanying drawings wherein:

FIGURE 1 is a partially broken away perspective view of a gas separation system and illustrates the use therein of a gas separator constructed in accordance with my invention.

FIGURE 2 is a partially broken away perspective view of a gas separator constructed in accordance with a first embodiment of my invention;

FIGURE 3 is a partial transverse section of the gas separtor of FIGURE 2;

FIGURE 4 is a view in the nature of a sectional view taken on line 4—4 of FIGURE 3 and illustrates the principal of operation of the gas separator of FIGURE 2;

FIGURE 5 is a sectional view taken along line 5—5 of FIGURE 3;

FIGURE 6 is a sectional view taken on line 6—6 of FIGURE 5;

FIGURE 7 is a view in the nature of FIGURE 5 but illustrates a louver of somewhat modified design;

FIGURE 8 is a perspective view of "cow catcher" type gas separator constructed in accordance with a second embodiment of my invention;

FIGURE 9 is a top elevational view of the gas separator of FIGURE 8;

FIGURE 10 is a sectional view taken along line 10—10 in FIGURE 9;

FIGURE 11 is a perspective view of a somewhat modified gas separation system and illustrates the use therein of a gas separator constructed in accordance with my invention;

FIGURE 12 is a partial transverse section, in the manner of FIGURE 3 of a gas separator constructed in accordance with a third embodiment of my invention;

FIGURE 13 is a perspective view of a gas separation louver from the separator of FIGURE 12; and FIGURE 14 is a sectional view taken along line 14—14 of FIGURE 12.

Referring now to FIGURE 1 a gas separation system is indicated generally at 20 and comprises flow conduit 22, with inlet 24, and flow conduit 26, with outlet 28. Gas separator means 30, including a separated gas outlet means 32, are oriented as shown in generally vertical manner at the juncture of the flow conduits 22 and 26. In operation, as briefly described at this juncture for introductory purposes only, a gas-laden liquid stream enters at inlet 24, as for example, under the influence of gravity or through the operation of suitably connected pump means. The gas-laden liquid stream passes through conduit 22 and then through the gas separator means 30, with resultant separation of the gas and liquid therein. The gas is collected and passed from the system through the separated gas outlet means 32 and the substantially gas-free liquid now flows through connecting conduit 26 to the outlet 28 for the system.

A first form of the gas separator means 30 is depicted in FIGURES 2 through 6 and comprises a plurality of vertically stacked louvers 34, each of which is channel shaped in cross section as made clear by FIGURES 2 and 4, and is of moderate V form in front view as made clear by FIGURES 2 and 3.

Extending from the edge portions of the respective sides 34e (FIGURE 4) of the channel-shaped louvers 34 are projections or spacing supports 34f which are aligned so that in assembled position the louvers 34 will rest upon each other and will be held in spaced relation to each other to provide a plurality of substantially horizontal fluid flow passages 35 therebetween as is shown in FIGURES 2, 3 and 5 of the drawings.

FIGURES 2, 3 and 5 further show that in assembled position the respective ends of each louver 34 extend into a substantially box-like support frame, generally designated 36, which includes generally U-shaped, spaced vertical members 37a and 37b joined at their ends to generally U-shaped transverse members 38a and 38b. Members 37a and 38a each include a louver support, as illustrated at 39a for support member 37a in FIGURES 2 and 3, upon which the spacing support 34f of the lowermost louvers 34 rest to thus provide a support base for the entire louver stack. In addition, since it is desired to inhibit liquid flow in the area below the lowermost louvers, transverse support member 38a includes dam means 38d which extend as shown to locations just below the said lowermost louvers.

The projections or spacing supports 34f represent only one means of forming the horizontal fluid flow passages between the louvers and it will be understood by those skilled in the art that this can be done by many other techniques, one of which will be illustrated below in respect to the forms of the invention illustrated in FIGURES 8, 9 and 10.

The generally U-shape of the vertical support members 37a and 37b provides generally shielded, vertical flow passages 37c and 37d therein (see also FIGURE 12) which are connected as shown with a generally shielded, horizontal flow passage or collecting chamber 38c provided by the generally U-shape of support member 38b. Thus, it is believed made clear whereby the generally vertical flow passages 37c and 37d, and the connected, generally horizontal flow passage or collecting chamber 38c can function to provide separated gas bubble collection means. The separated gas removal conduit 32 in turn will pass the separated gas bubbles from the gas separator means 30 because it is in communication with the horizontal flow passage 38c. Because the upper ends of the louvers 34 extend well into the support member flow passages 37c and 37d there is a clearance provided as indicated at 40 in FIGURES 3 and 6 to facilitate the upward flow of the separating gas bubbles through said flow passages 37c and 37d into the horizontal flow passage 38c as explained in greater detail below.

Briefly described, however, it may at this juncture be noted that the respective louvers 34 are configured to provide for the natural separation of a gas from the liquid during the flow of a gas-laden liquid through the substantially horizontal flow passages 35. In addition, the moderale V-shaping of the louvers, as seen from the front of the gas separator means, will effect the transport of the thusly separated and much less dense gas through the liquid stream to the respective louver extremities and therefrom into the flow passeges 37c and 37d which are formed in the vertical support members 37a and 37b.

Referring now to FIGURE 7, it may be noted that the louver 34b depicted therein, which would be the uppermost louver to extend into the vertical flow passage 37c of support member 37a as seen in FIGURE 3, comprises a cutout 52 formed as shown in the extremity thereof which projects into the said flow passage. For use of this type of louver in the gas separator means of my invention, each of the louvers 34b which project into flow passages 37c and 37d would comprise this end cutout, and the said cutouts would be arranged in substantial vertical alignment to aid the collection of the separated gas within the vertical flow passages 37c and 37d providing a gas flow continuum through the said cutouts unobstructed by the extremities of adjacent louvers. In addition, the use of louvers 34b, as described above, would result in a more compact gas separator means in that the necessity for the provision of a clearance, as indicated at 40 in FIGURES 3 and 6, between the louver extremities and the adjacent outer walls of the support members 37a and 37b would be eliminated as should be obvious.

The embodiment of FIGURES 8 through 10 is similar to the embodiment of FIGURES 2 through 6 in comprising a generally box-like, hollow support frame 36d which includes spaced, generally vertical support members 42 and 44 joined as indicated to spaced, generally transverse support members 46 and 48. The support members 42, 44 and 46 are hollow, but include inner walls as indicated at 50 and 52 in FIGURES 8 and 10, and openings 54 are formed in these inner walls through which the louvers extend for support and which communicate with the respective louver underside portions.

In the subject embodiment, the louvers are identified as 34d and are of the generally L-shaped cross section made clear by FIGURE 10. The louvers 34d are supported in the respective, hollow, support members 42, 44 and 46 by the resting of the louver underside edges on the edges of the openings 54 as indicated at 56 in FIGURE 10. Flow passages 59, 60 and 62 are provided in the hollow support members 42, 44 and 46, and these flow passages communicate with the louver underside portions through the openings 54, and with the separated gas removal conduit 32 as made clear by FIGURE 8.

In the embodiment of FIGURES 8 through 10, the gas separator means of the invention is of the "cow catcher" type through the generally V-shape in top view of the gas-liquid stream accepting face as indicated at 45 in FIGURE 8. This is, of course, accomplished through the V-shape in top view and, somewhat inclined configuration of the support members 46 and 48 and the V-shaping in top view of the louvers 34d. Thus, a dividing line 55 is presented by adjacent louver apexes which would function to initially divide the gas liquid stream prior to the flow thereof through this embodient of the gas separator means of my invention. A significant advantage of the embodiment of FIGURES 8 through 10 resides in the fact that the same provides, through the generally V-shape in top view configuration thereof, increased liquid-gas stream flow area, and attendant increased gas separation efficiency, without requiring increased gas separator means cross sectional area.

The embodiment of FIGURES 12, 13 and 14 is similar to the embodiment of FIGURES 2 through 6 in all respects with the exception that the louvers 34c of the latter are of the generally curved configuration made clear by FIGURES 13 and 14, and comprise extended trailing edges 58 (FIGURE 14) which functions to provide increased flow guidance to reduce turbulence in the exit flow of the liquid from the flow passages 35.

FIGURE 11 is provided to illustrate a gas separation system, as indicated at 20v, which is somewhat different from that of FIGURE 1, and makes clear that suitable shaping of the separation system conduits 22 and 26 can result in generally vertical flow of the liquid-gas stream prior to the entrance thereof into the gas separator means of the invention, and generally vertical exit flow of the then substantially gas-free liquid stream therefrom. A separator system in the nature of 20v would probably prove more suitable for applications in which gravity feed were relied upon to provide fluid flow therethrough, and might also provide for improved, initial gas separation by requiring a relatively abrupt turn in fluid flow direction at the entrance thereof as made clear by FIGURE 14.

At this juncture it is stressed, however, that all of the disclosed gas separator means embodiments of the invention are equally well suited for use in either type of gas separation system, namely 20 or 20v.

Operation

In operation for use, for example, in the unloading or "pumping out" of a large oil tanker as referred to hereinabove, a gas separation system 20 (FIGURE 1) incorporating therein gas separation means of the nature depicted in FIGURES 2, 3, 5 and 6 would be connected in the ship's pumping system upstream of the main, centrifugal discharge pump in such manner that the outlet conduit 28 would feed directly to the inlet of the said centrifugal pump. Thus, operation of the latter, once primed, would result in the flow of the oil, containing the oil vapors entrained therein in gas bubble form, to and through the gas separation system 20, whereby the entire interior of the gas separator means 30, including the passages 35 formed between the louvers 34, and the internal flow passages 37c, 37d and 38c in the support members 37a, 37b and 38b will be filled by the oil-gas bubble mixture.

The substantial horizontal flow of the gas bubble-laden oil through the flow passages 35 will enable the natural buoyancy of the gas bubbles to take effect and result in the rising thereof, as seen in FIGURE 4 through the oil to the flow passage portions adjacent the underside of each of the louvers 34. Thus, the gas bubbles will collect at these louver underside flow passage portions with the louver edges 34e preventing substantial oil flow through these flow passage portions and thus preventing the gas bubbles from being swept back into the main flow stream and through the gas separator means of the invention. In addition, the gas pressure of the collected bubbles will, of course, tend to maintain the flowing oil without these louver underside flow passage portions and will function to accelerate gas bubble flow along the louver undersides toward the support members 37a, 37b and 38b.

This gas bubble flow along the louver underside is, of course, provided by the oblique angle of the louvers 34 with the horizontal as best seen in FIGURES 2 and 3, since the gas tends to rise naturally in the oil and follow the upward slant of the louver toward the support members 37a, 37b and 38b.

As the gas bubbles emerge into the oil-filled, internal flow passages 37c, 37d and 38c, the former join one to another creatiing thereby a larger gas bubble having a larger upward velocity component than the small gas bubbles rising along the louver undersides.

The rising gas bubbles in the flow passages 37c and 37d of support members 37a and 37b flow into the flow passage 38c of support member 38b and, due to the pressure differential between this latter flow passage and the outside, gas is discharged therefrom through separated gas outlet 32. Of course, the gas bubbles collected at the undersides of the upper louvers 34 will be discharged directly into flow passage 38c in transversely extending suport member 38b and will join therein with the other gas bubbles. With regard to the internal flow passages 37c and 37d of the support members 37a and 37b it is to be understood that although the same are, of course, oil-filled during operation of the separator means to thus make possible the rising of the gas bubbles therein, the support member walls 64 and 66 (FIGURE 2) prevents cross flow therethrough to thus prevent the rising gas bubbles therein from being re-mixed with the flowing oil stream.

The cutout, channel shaped louver 34b of FIGURE 7, if incorporated in the separator of FIGURE 3, would operate in the same manner as discussed for the louvers 34. However, the cutout louver end as seen in FIGURE 7 would increase the upward velocity component within the flow passages 37c and 37d of support members 37a and 37b due to the larger vertical gas flow passageway formed by the cutouts 52. Therefore, it is expected that this design would be more efficient.

The gas separator means of the embodiment of FIGURES 8, 9 and 10 operate in the manner described hereinabove with the generally L-shaped louvers 34d functioning, in the manner of the louvers 34 to provide for the generally horizontal flow of the oil through the flow passages 35 with resultant rising of the gas bubbles therefrom and collection of the latter along the relatively protected, respective louver undersides. Therefrom, the gas bubbles will flow into and through openings 54 into the internal flow passages 59, 60 and 62 of the support members 42, 44 and 46 and, from the latter to the separated gas outlet 32. The use of the "cow catcher" form of gas separator means of FIGURES 8, 9 and 10 would provide a component of the oil velocity to assist the motion of the gas bubbles along the louver undersides toward the openings 54 as should be obvious. Other advantages of this form are the provisions of greater open cross sectional area for oil flow within a given gas separator means cross section, easier gas separator means cleaning and lower frictional losses for oil entry into the separator means.

FIGURE 11 depicts a gas separation system having generally vertical entrance and exit flow into and from the gas separator means. The change in the operation of the gas separator means produced by the vertical entrance and exit flow, is shown in FIGURES 12–14. Thus, as made clear by FIGURE 14, the gas bubble laden oil will experience a relatively abrupt change in flow direction upon entry into the flow passages 35 formed between the spaced, curved louvers 34c and this abrupt directional change will function to promote the rising of the gas bubbles during the nearly horizontal flow between the said louvers and the accumulation of the former, as described above, under the respective concave louver surfaces for flow into the support member internal flow passages 37c, 37d and 38c.

The extended trailing edges 58 of the louvers 34c will, in addition to reducing turbulence as discussed above, provide for the creation of some measurable back pressure in the flow passages 35 with the result that oil velocity therethrough will be reduced with attendant reduction in the initial tendency of the gas bubbles to flow right through the separator means along with the oil rather than be separated therefrom.

With regard to the angle which any of louvers 34, 34b, 34d and 34c make with the horizontal, it is noted that the same should be sufficiently large enough to measurably encourage rapid gas bubble migration along the louver undersides but not so large as to significantly increase the vertical distance between louvers relative to the shortest distance therebetween. At approximately 30° from the horizontal, the vertical distance remains only approximately fifteen percent in excess of the shortest distance while the force needed to move the gas bubbles toward the respective louver ends will still be approximately fifty percent of the vertical buoyant force. Accordingly, a louver angle of approximately 30° would appear optimum.

Although the operation of the embodiment of my invention has been described hereinabove primarily with regard to the separation of oil vapors, in bubble form from oil, it is of course to be clearly understood that the invention is by no means limited thereto, but rather is well suited for use in the separation of gas, in bubble form, from any of a wide variety of liquids and is not, in any event, limited to the separation of gases which are constituted of the vapor of the liquid in which they are entrained.

In addition, it is again stressed that all of the disclosed gas separator means embodiments are well suited for use in gas separation systems having inlet and exit liquid flow directions which range completely between the horizontal and vertical. Too, it is be made clear that the disclosed louver and support means configurations are completely interchangeable. Thus, for example, with suitable change in shaping to provide for a V-shaped in top view configuration, the curved louvers in the nature of louvers 34c would be perfectly suited for use in a V-shaped support member 36d, while generally L-shaped louvers in the nature of louvers 34d could again, with suitable change in shaping to provide a generally flat gas separator means face, find excellent utilization in a flat support means in the nature of 36.

It is understood that this invention is not to be limited to the specific construction or arrangement of parts shown but that they may be widely modified within the invention defined by the claims.

What is claimed is:
1. In a separator for removing gas bubbles from flowing liquids:
   support means providing a substantially horizontal liquid flow passage;
   a plurality of spaced louver means comprising louvers cooperatively associated with said support means and extending across said flow passage to divide the latter vertically into a plurality of spaced, substantially horizontal flow passages;
   each of said louvers having portions which are inclined upwardly somewhat with respect to the horizontal, said louver portions in turn having undersides constructed to form areas of substantially non-turbulent liquid flow;
   said support means comprising spaced support members between which said louver means extend; and
   gas bubble collection means comprising generally vertical flow passages formed in said support means which are in fluid flow communication with said louver portion underside areas whereby, as said liquid flows through said separator, the buoyant forces acting on said gas bubbles will cause the latter to separate from said liquid, collect at said non-turbulent louver underside areas and flow therefrom, due to the incline of said louver portions, to said gas bubble collection means.

2. In a separator as in claim 1 wherein said louvers are each of moderate V form in front view and are inclined upwardly from the respective, generally central areas thereof toward said support means.

3. In a separator as in claim 1 wherein each of said louvers is of inverted, generally channel-like cross section.

4. In a separator as in claim 1 wherein each of said louvers is of generally curved cross section with the underside thereof being concave.

5. In a separator as in claim 1 wherein each of said louvers is of generally L-shaped cross section.

6. In a separator as in claim 1 wherein:
   said support means comprise spaced, generally vertical support members between which said louver means extend, and a generally horizontal support member connecting said generally vertical support members at respective upper ends thereof, and
   said gas bubble collection means comprise connected, vertical and horizontal flow passages formed in said support members and in fluid flow communication with said louver portion underside areas.

7. In a separator as in claim 2 wherein each of said louvers is of inverted, generally channel-like cross section.

8. In a separator as in claim 2 wherein each of said louver means is of generally V-shaped in top view configuration with the respective generally central area thereof being spaced horizontally from the respective louver means ends.

9. In a separator as in claim 1 wherein the end portions of some of said louver means extend into said generally vertical flow passages and comprise generally vertically aligned cutouts formed therein to promote the upward flow of gas bubbles therein by providing a greater flow area therefor.

References Cited

UNITED STATES PATENTS

| | | | |
|---|---|---|---|
| 1,181,470 | 5/1916 | Massip | 55—440 |
| 1,463,769 | 7/1923 | Wood | 55—442 |
| 2,657,760 | 11/1953 | Glasgow | 55—176 X |
| 2,954,842 | 10/1960 | Coulter | 55—440 |

REUBEN FRIEDMAN, Primary Examiner

R. W. BURKS, Assistant Examiner